United States Patent
Ökvist et al.

(10) Patent No.: US 12,101,167 B2
(45) Date of Patent: Sep. 24, 2024

(54) METHODS, BASE STATION AND WIRELESS DEVICE FOR HANDLING OF CONNECTIONS OF WIRELESS DEVICES TO AIRBORNE BASE STATIONS

(71) Applicant: Telefonaktiebolaget LM Ericsson (publ), Stockholm (SE)

(72) Inventors: Peter Ökvist, Luleå (SE); Tommy Arngren, Södra Sunderby (SE); Stefan Wänstedt, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/365,295

(22) Filed: Aug. 4, 2023

(65) Prior Publication Data

US 2023/0379044 A1 Nov. 23, 2023

Related U.S. Application Data

(63) Continuation of application No. 16/768,938, filed as application No. PCT/SE2017/051267 on Dec. 13, 2017, now Pat. No. 11,722,209.

(51) Int. Cl.
*H04B 7/185* (2006.01)
*H04W 36/32* (2009.01)
*H04W 84/06* (2009.01)

(52) U.S. Cl.
CPC ........ *H04B 7/18506* (2013.01); *H04W 36/32* (2013.01); *H04W 84/06* (2013.01)

(58) Field of Classification Search
CPC ... H04B 7/18506; H04B 7/185; H04W 36/32; H04W 84/06
See application file for complete search history.

(56) References Cited

U.S. PATENT DOCUMENTS

| | | | |
|---|---|---|---|
| 10,111,152 B2 * | 10/2018 | Axmon | H04W 16/28 |
| 2006/0030311 A1 | 2/2006 | Cruz et al. | |
| 2007/0290919 A1 | 12/2007 | Carpenter | |
| 2009/0017819 A1 | 1/2009 | Fox et al. | |
| 2009/0047941 A1 | 2/2009 | Dembski-Minssen et al. | |
| 2009/0176475 A1 | 7/2009 | Salkini et al. | |
| 2010/0311460 A1 | 12/2010 | Hofmann et al. | |

(Continued)

FOREIGN PATENT DOCUMENTS

| | | |
|---|---|---|
| EP | 2632060 A1 | 8/2013 |
| WO | 2010 123416 A1 | 10/2010 |
| WO | 2019 011427 A1 | 1/2019 |

OTHER PUBLICATIONS

When COWs Fly: AT&T Sending LTE Signals from Drones by Art Pregler, Technology Blog—downloaded May 29, 2020.

(Continued)

*Primary Examiner* — Kabir A Timory
(74) *Attorney, Agent, or Firm* — Baker Botts L.L.P.

(57) ABSTRACT

Disclosed is a method performed by an airborne base station (155) arranged at an aircraft (160) and providing radio coverage to a wireless device (150) residing in the aircraft (160). The method comprises obtaining altitude information indicating at least one of the present altitude of the aircraft (160) and an altitude rate of change of the aircraft (160), and handling a connection of the wireless device (150) to the airborne base station (155) based on the obtained altitude information.

16 Claims, 10 Drawing Sheets

(56) References Cited

U.S. PATENT DOCUMENTS

2013/0165103 A1    6/2013   Ammari et al.
2016/0226574 A1    8/2016   Lamarca et al.
2018/0248613 A1    8/2018   Peitzer et al.

OTHER PUBLICATIONS

3GPP TS 36.331 v14.2.2; Technical Specification; 3rd Generation Partnership Project; Technical Specification Group Radio Access Network; Evolved Universal Terrestrial Radio Access (E-UTRA); Radio Resource Control (RRC); Protocol specification (Release 14)—Apr. 2017.
PCT Notification of Transmittal of the International Search Report and the Written Opinion of the International Searching Authority, or the Declaration issued for International application No. PCT/SE2017/051267—Oct. 10, 2018.
Ericsson White Paper; Cellular Networks for Massive IOT, Enabling Low Power Wide Area Applications—Jan. 2016.
Using Air-To-Ground LTE for In-Flight Ultra-Broadband, Opening the Skies to the New Possibilities, Strategic White Paper, Alcatel-Lucent—May 2015.
Extended European Search Report issued for Application No. / Patent No. 17934916.2-1205 / 3725013 PCT/SE2017051267—Nov. 26, 2020.

\* cited by examiner

METHODS, BASE STATION AND WIRELESS DEVICE FOR HANDLING OF CONNECTIONS OF WIRELESS DEVICES TO AIRBORNE BASE STATIONS

PRIORITY

This application is a continuation, under 35 U.S.C. § 120, of U.S. patent application Ser. No. 16/768,938 filed on Jun. 2, 2020 which is a U.S. National Stage Filing under 35 U.S.C. § 371 of International Patent Application Serial No. PCT/SE2017/051267 filed Dec. 13, 2017 and entitled "Methods, Base Station and Wireless Device for Handling of Connections of Wireless Devices to Airborne Base Stations" which are hereby incorporated by reference in their entirety.

TECHNICAL FIELD

The present disclosure relates generally to methods, base stations and wireless devices of communications systems for handling of connections of wireless devices to base stations, particularly to airborne base stations.

BACKGROUND

In today's wireless communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for radio communication. A wireless communications network comprises network nodes, i.e. base stations or radio base stations, providing radio coverage over at least one respective geographical area forming a cell. The cell definition may also incorporate frequency bands used for transmissions, which means that two different cells may cover the same geographical area but using different frequency bands. Wireless devices, also known as mobile stations, terminals, and/or User Equipment, UEs, are served in the cells by the respective network node and are communicating wirelessly with respective network node. The wireless devices transmit data over an air or radio interface to the network nodes in uplink, UL, transmissions and the network nodes transmit data over an air or radio interface to the wireless devices in downlink, DL, transmissions.

Today, the availability of broadband connections is constantly increasing, and users are increasingly accustomed to always being connected and having access to the Internet.

The airline market serves hundreds of millions of passengers every year, and passenger traffic totals are constantly increasing. Being able to provide passengers with connectivity for the whole duration of the flight is becoming more and more important and there is competition between airlines regarding who can provide the best connectivity. Virtually all passengers carry their own wireless devices, such as smartphones, laptops, tablets and similar devices, with which they want to make use of the broadband connectivity provided on-board aircrafts.

Broadband connectivity may be provided to wireless devices on board an air-craft through the use of a base station on-board the aircraft, also called an airborne base station. Such a base station may be connected to a wireless communications system via a backhaul link. The backhaul link is a wireless point to point connection, either through satellite or through a ground communications network. Using only land-based stations works well while the airplane flies over land, and for routes over the ocean the airplane may rely on satellites for passenger broadband. The airborne base station provides wireless radio coverage to wireless devices on-board the aircraft. The wireless radio coverage may be provided via the 4G system, or via Wireless LAN, WLAN. The wireless devices may connect to the airborne base station, and the airborne base station may then connect the wireless device to the ground communications system, either via satellite or via base stations on the ground.

A problem with existing solutions is that wireless devices on-board the aircraft may try to connect directly to base stations on the ground, even though the chance of succeeding with such connections is low. Such connection attempts cause unnecessary signaling and interference in the ground communications system. Further, wireless devices attempting to connect to ground will consume much more power than if connected to the airborne base station and therefore also risk emptying their batteries.

Consequently, there is a need for better solutions for handling connections and signaling of wireless devices on-board aircrafts.

SUMMARY

It is an object of embodiments of the invention to address at least some of the problems and issues outlined above. It is an object of embodiments of the invention to provide an airborne base station and a wireless device which decrease the overall signaling load of a communication system. It is further an object of embodiments of the invention to provide a communication system with a more efficient usage of radio resources. It may be possible to achieve these objects and others by using methods, airborne base stations, wireless devices and computer programs as defined in the attached independent claims.

According to one aspect, a method is provided performed by an airborne base station, the airborne base station being arranged at an aircraft and providing radio coverage to a wireless device residing in the aircraft. The method comprises obtaining altitude information indicating at least one of the present altitude of the aircraft and an altitude rate of change of the aircraft, and handling a connection of the wireless device to the airborne base station based on the obtained altitude information.

According to another aspect, a method is provided performed by a wireless device, the wireless device residing in an aircraft, wherein an airborne base station is arranged at the aircraft and provides radio coverage to the wireless device. The method comprises receiving altitude information indicating at least one of the present altitude of the aircraft and an altitude rate of change of the aircraft, from the airborne base station.

According to another aspect, a base station configured for airborne use is provided, which is arranged to provide radio coverage to a wireless device residing in an aircraft, when the base station is arranged in the aircraft. The base station comprises a processor and a memory. The memory contains instructions executable by the processor, whereby said base station is operative for obtaining altitude information indicating at least one of the present altitude of the aircraft and an altitude rate of change of the aircraft. The base station is further operative for handling a connection of the wireless device to the airborne base station based on the obtained altitude information.

According to another aspect, a wireless device is provided, which is operable for wireless communication with a base station configured for airborne use. When the wireless device and the base station are arranged at an aircraft, the wireless device receives radio coverage from the base station. The wireless device comprises a processor and a memory. The memory contains instructions executable by the processor, whereby said wireless device is operative for receiving altitude information indicating at least one of the present altitude of the aircraft and an altitude rate of change of the aircraft, from the base station.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of example embodiments and with reference to the accompanying drawings, in which.

DETAILED DESCRIPTION

Briefly described, a base station communications system for devices on-board aircrafts is provided, which is resource efficient and decreases the signaling load and interference of the network. The system comprises an airborne base station, ABB, and a wireless device, wherein the base station provides radio coverage to the wireless device. The term ABB may in some embodiments refer to a base station being in the air, such as a base station on-board of an aircraft when the aircraft is in the air. The term airborne base station may in some embodiments refer to a base station configured for airborne use but which has not yet been deployed at an aircraft, and/or it may refer to a base station configured for airborne use deployed at an aircraft but which is not yet airborne, such as when the aircraft is standing still on the ground, The base station is backhaul-connected to a ground communication system via a direct wireless connection or via a satellite communication system. Typically, both the base station and the wireless device are on-board the same aircraft, and the methods and nodes described herein are typically performed while the aircraft is in the air. The airborne base station obtains, from the aircraft, altitude information indicating at least one of the present altitude of the aircraft and an altitude rate of change of the aircraft, wherein the present altitude and the altitude rate of change of the aircraft is virtually the same as the present altitude and the altitude rate of change of the airborne base station and the altitude of the wireless device, since both the base station and the wireless device are on-board the aircraft. The altitude information may then be used to determine when a direct connection from the wireless device, WD, to base stations of the ground communication system is feasible and when it is not, such that the wireless device is instructed to not perform any measurements on base stations other than the airborne base station, when the aircraft is above a certain altitude. Further, the wireless devices may also be instructed to start communicating with the ground communications system when the aircraft is below a predefined altitude, and may include the altitude information in its signaling with the ground communication system.

Figure 1:
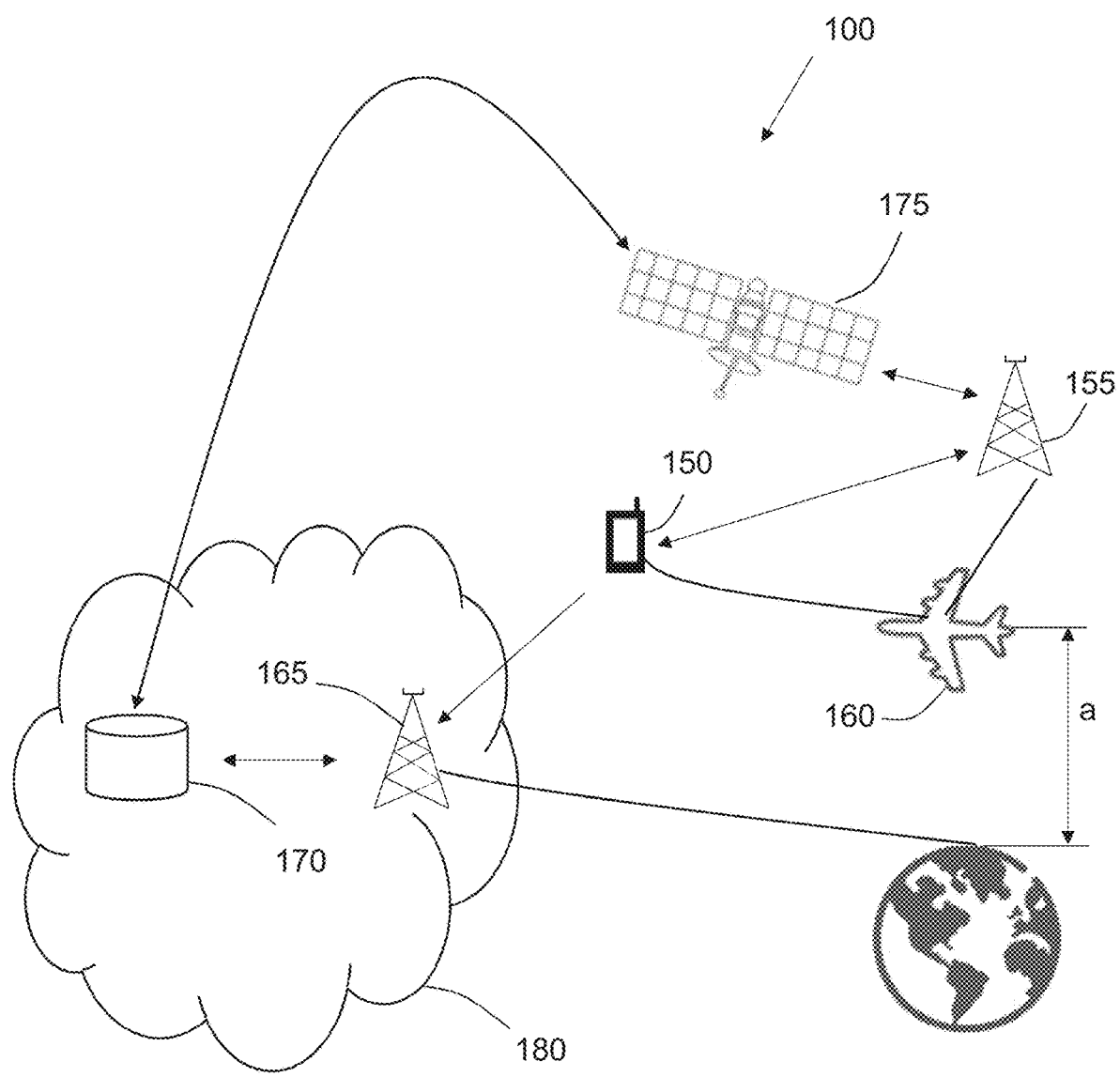
FIG. 1 is a view of a communications system in which embodiments of the present disclosure may be performed.

FIG. 1 shows an example of a wireless communications system 100 in which embodiments herein may be implemented. The wireless communications system 100 may be a radio communication system, and at least parts of the wireless communications system may communicate via LTE-Advanced, Wideband Code-Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM network, or other cellular network or system, such as, a future 5G wireless communication system.

The wireless communications system 100 comprises a wireless device, WD, 150 residing on-board an aircraft 160. The aircraft is in the air at a certain altitude a above ground level. An ABB 155 is located on-board the aircraft. The ABB 155 may be an eNB, eNodeB, a home Node B, a Home eNode B, a gNode B, or any other network unit capable to serve a WD in the wireless communications system 100. The ABB 155 provides radio coverage within its cell, and the WD 150 is within the cell of the ABB 155 when residing on-board the aircraft 160. The ABB 155 may be connected, via a satellite 175 or via an Air-to-Ground, A2G, connection to a ground communications network 180 comprising a number of ground base stations 165 and an Operations and Management, O&M, node 170. Further, depending on the altitude of the aircraft 160, the WD 150 may also be able to communicate directly with base stations 165 on the ground. Other factors may also be relevant, for example it is more likely that the WD is able to communicate with base stations 165 on the ground when the aircraft 160 is flying over land, and less likely when the aircraft 160 is flying over water. When the aircraft 160 is in the air and above a certain altitude, it is typically only possible for the WD 150 to communicate with the ABB 155.

Each cell to which a base station provides radio coverage, has a list of neighbor relations, which is stored in a Neighbor Relation table, NRT, which is maintained by the base station of that cell. The NRT of a cell comprises information regarding neighboring cells, such as the Cell Global Identification, CGI, or extended CGI, eCGI, and the Physical Cell Identity, PCI, of the neighboring cells. Additionally, the NRT entry also comprises information about X2 availability, i.e. if eNBs are able to communicate directly with each other, whether the neighbor relation may be used for handover or not, and if the neighbor relation may be removed or changed by the Automatic Neighbor Relation, ANR, function.

The ANR function exists in LTE, and its objectives are to automatically add and remove entries to or from NRT. Additions to NRT are done by use of Radio Resource Control, RRC, signaling between the base station and WDs which provide measurement control and reporting means. Measurements of neighbor cells is defined by use of RRC, i.e. the WDs report measurement information to a base station serving the WD, and the WDs may also decode and report the unique CGI information of cells that belong to base stations which may be used for serving the WD, upon request by the base station. Depending on the measurements reported by the WDs, the ANR function may add new neighbor relations or remove existing neighbor relations.

Figure 2:
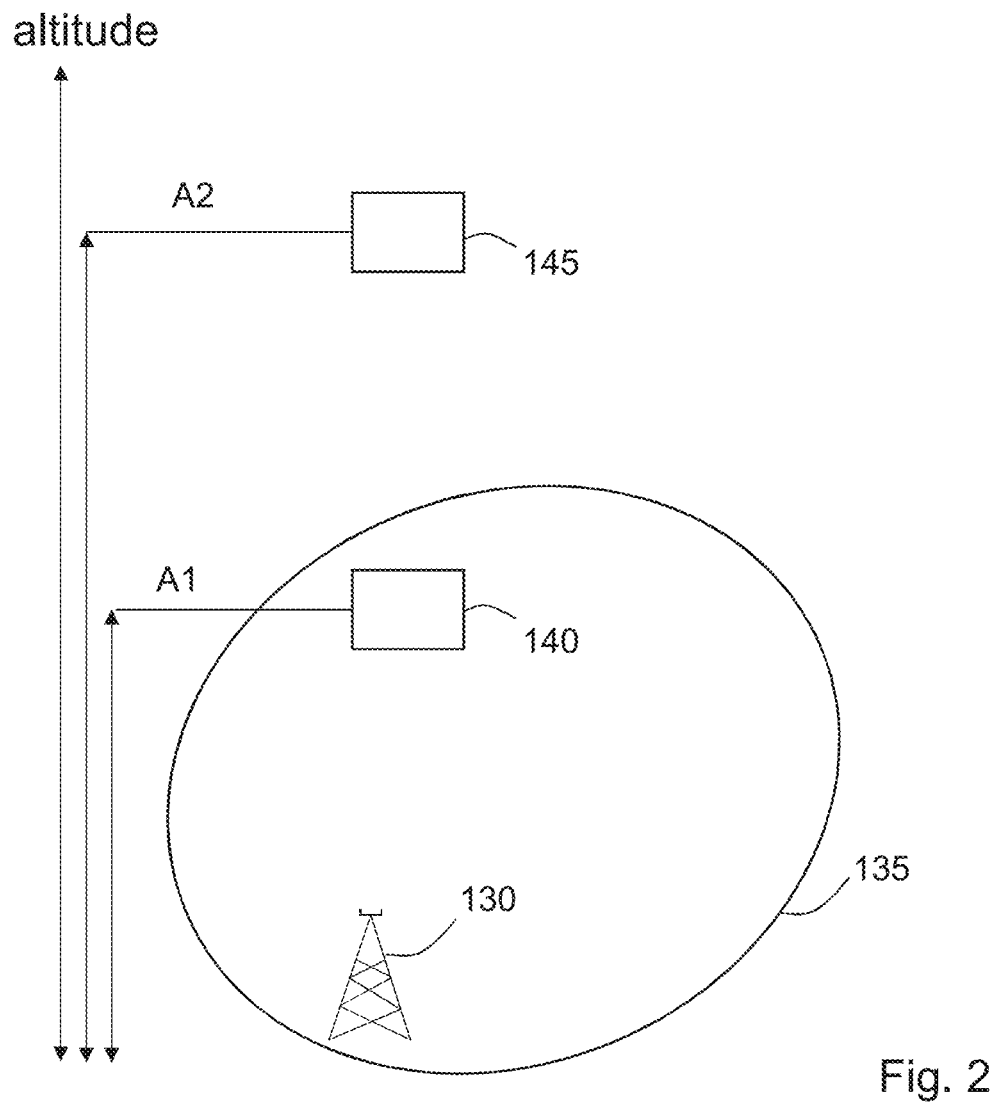
FIG. 2 is a view of base station coverage in relation to different heights.

A problem with the connection of WDs on-board aircrafts that are in the air is that the WDs will be able to detect signaling from network nodes on the ground from very far distances due to the WDs being airborne and thus having a birds-eye view, but the network nodes may be so far away that they are not suitable for communication with the WDs. This is illustrated in FIG. 2, which comprises a ground base station 130 providing radio coverage to a first cell 135. Both a first WD 140 on-board a first aircraft situated on a first altitude A1 and a second WD 145 on-board a second aircraft situated on a second altitude A2 are able to detect signals from the ground base station 130. The first altitude A1 is an altitude sufficiently low that the first WD 140 may successfully be served by base station 130 providing radio coverage to the first cell 135. The second altitude A2 is an altitude higher than the first altitude A1. The second altitude A2 is too high for the second WD to be successfully served by the base station 130 providing radio coverage to the first cell 135.

In existing systems, no altitude information is included in any of the signaling, and therefore it may be difficult for the WD 150 to know that it is not suitable to attempt connecting with the ground base station 130, or to know that it should not even attempt to measure signals from the ground base station 130.

Figure 3:
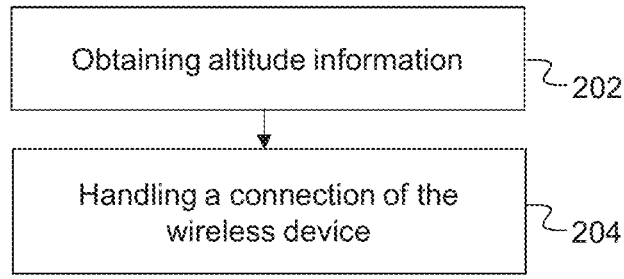
FIG. 3 schematically shows method steps of a first embodiment of a method for handling communications.

FIG. 3, in conjunction with FIG. 1, shows an embodiment of a method performed by an airborne base station 155 of an aircraft 160, the ABB 155 providing radio coverage to a WD 150 residing in the aircraft. The ABB 155 may be connected, via a satellite 175 or via A2G, to a ground communications network 180 comprising a number of ground base stations 165 and an Operations and Management, O&M, node 170. The method comprises obtaining 202 altitude information indicating at least one of a present altitude of the aircraft and an altitude rate of change of the aircraft. The altitude information is typically obtained via aircraft sensors that reports the altitude information either directly to the ABB 155 or via a control unit of the aircraft. If the altitude information indicates an altitude rate of change of the aircraft, the altitude rate of change may be calculated based on information such as the present altitude, a previous altitude and a time interval in between, or it may be obtained from the aircraft sensors. The method further comprises handling 204 a connection of the WD 150 to the ABB 155, based on the obtained altitude information.

By including altitude information of the aircraft in the signaling from the ABB of the same aircraft to a WD residing in the same aircraft, it becomes possible to improve handling of the connection of the WD to the ABB. By including an altitude rate of change, it becomes possible to calculate at which altitude the aircraft, and thus also the WD and the ABB, will be located at a future point in time. This enables having predefined sets of Neighbor Relation Tables, NRTs, available such that an updated NRT may be held available more or less frequently depending on how fast a cell to which the ABB provides radio coverage will need a new NRT for a new altitude range.

The handling step may for example comprise instructing the WD to not perform measurements on signals from base stations other than the ABB, when the altitude is above a certain threshold. It may also comprise instructing the WD to perform measurements on signals from base stations other than the ABB, when the altitude is below a certain threshold. The handling step may also comprise updating a Neighbor Relation Table, NRT, based on the altitude information or based on received measurements. The handling step may further comprise making a handover decision based on the received measurements or predicting a future handling of a connection of the WD to the ABB, based on the received measurements. It may further comprise performing the predicted handling of the connection of the wireless device. The handling step may also comprise providing the altitude information to the WD. This may result in that the WD only communicates with base stations on the ground when it is possible to successfully communicate with base stations on the ground. Such handling steps may decrease the signaling in the system, such as handover signaling, and enables a more efficient use of radio resources.

In some embodiments, the method further comprises instructing the WD to not perform measurements on base stations other than the ABB, when the altitude is above a predefined threshold. When the aircraft, and thus also the WD residing in the aircraft and the ABB deployed in the aircraft, is in the air, it may be too far away from any available base stations on the ground to successfully communicate with them, but the WD may still be able to receive signals from such base stations and perform measurements on the signals and report the measurements to the ABB. Such measurements and signaling in the aircraft may be unnecessary in cases when the WD is at an altitude which is too high to successfully communicate with and/or connect to base stations on the ground. By the ABB instructing the WD to not perform any measurements on base stations other than the ABB, unnecessary signaling may be reduced. The predefined altitude threshold above which the WD is instructed to not perform measurements on other base stations may depend on the capabilities of the base stations on the ground and on the capabilities of the WD, and may for example be in the range of 0-1000 meters, such as between 100 and 500 meters.

In some embodiments, the step of handling 204 may comprise updating a neighbor relation table, NRT, for a first cell to which the ABB provides radio coverage, based on the altitude information. The updating may comprise updating the neighbor relation table for the first cell such that the NRT of the first cell contains no neighbors, when the altitude information indicates that the aircraft, and thus also the WD and the ABB, is at an altitude above a predefined threshold value. In some embodiments, updating the NRT may comprise updating the NRT to state that no neighbor relations may be used for handover, when the altitude is above a predefined threshold value. Updating the NRT of the first cell such that the first cell has no neighbors, or such that the first cell is not allowed to use any neighbor cells for handover, may be performed when an aircraft is taking off, landing and/or when the aircraft is in the air. By updating the NRT in such a way as described above, unnecessary signaling may be avoided, which results in less signaling load overall in the system. The predefined threshold value above which the NRT of the first cell is updated to contain no neighbors, or to state that no neighbors may be used for handover, may depend on the capabilities of the base stations on the ground and on the capabilities of the WD, and may for example be in the range of 0-1000 meters, such as between 100 and 500 meters. In some embodiments, the altitude threshold value for updating the NRT to contain no neighbors may be higher than the altitude threshold value for updating the NRT to state that no neighbors may be used for handover.

Figure 4:
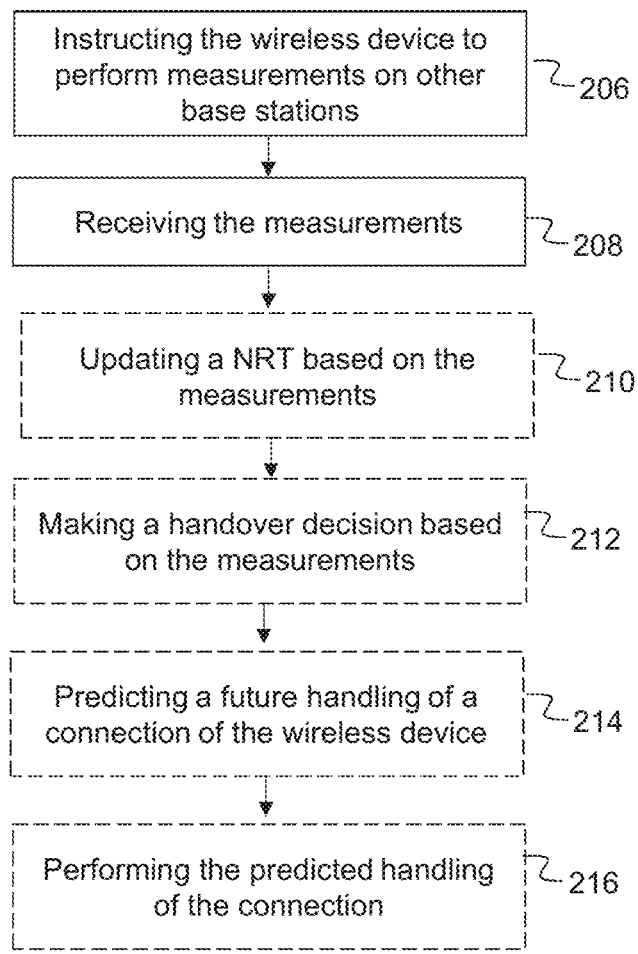
FIG. 4 schematically shows different handling steps for the method of the first embodiment.
Figure 5:
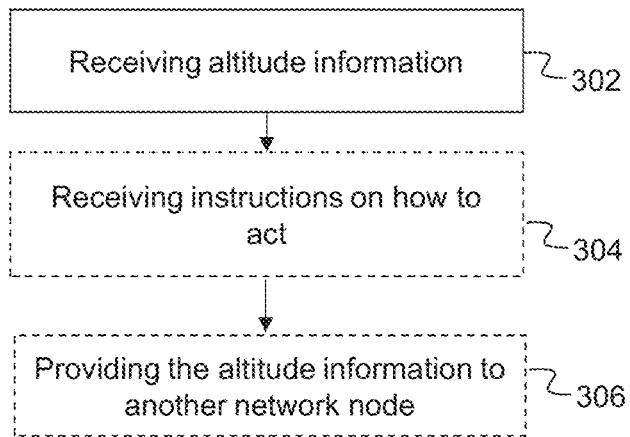
FIG. 5 schematically shows method steps of a second embodiment of a method for handling communications.

FIG. 4 shows different embodiments comprising different handling steps 204 of a method performed by an ABB. In some embodiments, the step of handling 204 a connection of the WD may comprise instructing 206 the WD to perform measurements on base stations other than the ABB, when the altitude is below a predefined threshold, and receiving 208 the measurements from the WD. Typically, the step of instructing 206 the WD to perform measurements on base stations other than the ABB is performed when the altitude information is below a predefined threshold, such as when the aircraft is landing and goes from being above a predefined threshold to being below the predefined threshold. Instructing 206 the WD to perform measurements on signals of other base stations than the ABB, and receiving 208 such measurements may be relevant for enabling the ABB to: update a NRT, making a handover decision, or predicting a future handling of the connection of the WD to the ABB. In some embodiments, the WD may be instructed to perform measurements over a period of time, or at two different points in time. In this way, a rate of change of a parameter comprised in the measurements may be determined and used for decision making, for example a rate of change of the signal strength may be relevant for planning ahead for future decisions.

In some embodiments, the step of handling 204 a connection of the WD may further comprise updating 210 a NRT based on the received measurements. In the previously described embodiment, updating a NRT may be based on the altitude information, but a NRT may also be updated based on measurements received from the WD. Updating 210 a NRT based on the received measurements may comprise adding a new cell as a neighbor for the cell to which the ABB provides radio coverage. Going from a situation in which the first cell has no neighbors to a step of instructing the WD to perform measurements on potential target cells typically occurs during landing, since the aircraft is descending from an altitude which is too high for the WDs to successfully communicate with base stations on the ground, to an altitude which is low enough for it to successfully communicate with base stations on the ground.

In some embodiments, the step of handling 204 may further comprise making 212 a handover decision for the WD, based on the received measurements. By having information comprised in the measurements received from the WD, such as signal strength, it becomes possible to determine to which base stations it would be possible and/or suitable to make a handover of the WD. Typically, the step 212 of making a handover decision would be performed when the WD may be better served by the ground communications network than by the ABB, such as when the aircraft is landing.

In some embodiments, when the altitude information indicates both a present altitude and an altitude rate of change, the handling step 204 may further comprise predicting 214 a future handling of the connection of the WD. Such a future handling may be a future handover decision, or it may be a future update of a NRT for the cell to which the ABB provides radio coverage and in which the WD resides. By having information regarding the altitude and the altitude rate of change of the aircraft, as well as measurements of signals from other base stations, it becomes possible to predict to which base stations a handover may be suitable at a future point in time, or which base stations and/or cells of base stations that should be added and/or removed to a neighbor relation table at a future point in time. By planning ahead in this manner, a more efficient usage of radio resources may be achieved, and overall signaling in the network may be reduced. In some embodiments, the step of handling 204 may further comprise also performing 216 the predicted handling of the device, at the appropriate time. As will be understood, sometimes the timing of the predicted future handling may change, for example due to the aircraft slowing down as compared with predictions, due to changes in course, and other similar events.

In some embodiments, the step of handling may comprise providing the altitude information to the WD. By providing the altitude information to the WD, the WD may make use of the altitude information when communicating with other base stations, such as base stations on the ground when the aircraft is approaching ground level during landing, or when the aircraft is taking off. The WD may for example include the altitude information in its RRC signaling, which facilitates handling of the WD by a ground base station.

In embodiments comprising providing 214 the altitude information to the WD, the altitude information may be provided in different ways. In some embodiments, the altitude information may be broadcasted by the ABB, such that all devices being able to detect signals from the ABB, i.e. all WDs in the same aircraft as the ABB, are able to obtain the altitude information. The altitude information may for example be provided in a MasterInformationBlock, MIB, message, as defined in LTE (TS 36.331, version 14.4.0, sections 5.2.1.1 and 5.2.1.2). Generally, a MIB message also carries essential information needed for the WD to acquire other information from the base station, including downlink channel bandwidth, PHICH configuration, System Frame Number SFN, transmit antenna configuration of the base station specifying number of transmit antennas.

In some embodiments, the altitude information may be provided to the WD in a SystemInformationBlock, SIB, message, as defined in LTE. SIB messages, other than SystemInformationBlockType1, are carried in SystemInformation, SI, messages and mapping of SIBs to SI messages is flexibly configurable. SysteminformationBlockType1 and all SI messages are transmitted on Downlink Shared Channel, DL-SCH. The altitude information may be incorporated into already existing SIBs, or a new SIB may be created which incorporates the altitude information.

In some embodiments, the altitude information may be provided to the WD via a Wi-Fi-system on-board the aircraft, which may be useful when the WD is set to flight mode and has Wi-Fi enabled, i.e. the WD communicates with a Wi-Fi access point connected to the ABB.

Figure 6:
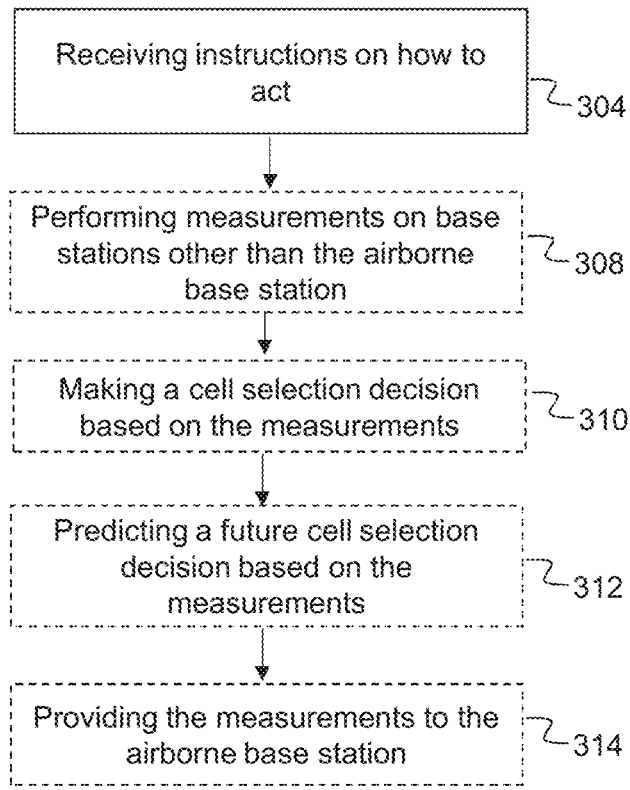
FIG. 6 schematically shows different instructions received by the wireless device in the method of the second embodiment.

FIG. 6, in conjunction with FIG. 3, shows an embodiment of a method performed by a wireless device 150, the WD residing in an aircraft 160, wherein an ABB 155 is arranged at the aircraft 160 and provides radio coverage to the WD 150. The ABB may be connected to a ground communications network 180 comprising a base station 165 and an O&M node 170, for example via satellite 175 or via an Air-to-Ground connection with base stations 165 on the ground.

The method comprises receiving 302 altitude information indicating at least one of the present altitude of the aircraft 160 and an altitude rate of change of the aircraft 160, from the ABB 155. Since the WD 150 resides in the aircraft 160, the altitude of the WD 150 will be the same as the altitude of the aircraft 160, and the same as the altitude of the ABB 155. By receiving the altitude information from the ABB, the WD may include this information when communicating with other base stations. The WD may also receive instructions regarding how to act, based on the received altitude information. This may decrease the overall signaling in the network and optimize the usage of radio resources.

The method may further comprise receiving 304 instructions from the ABB on how to act, based on the received altitude information. The step of receiving 304 instructions from the ABB on how to act may for example comprise receiving instructions to not perform measurements on any base stations other than the ABB when the altitude of the aircraft is above a predefined threshold. It may also comprise receiving instructions to perform measurements on signals from base stations other than the ABB when the altitude is below a predefined threshold and performing the measurements. It may further comprise receiving instructions regarding making a cell selection decision based on the measurements, such that the WD is instructed by the ABB to make a cell selection to a base station when the performed measurements are above a certain threshold, for example when the signal strength is above a predefined threshold. The received instructions may be instructions for predicting a future cell selection decision based on the measurements. The received instructions may be instructions regarding providing the measurements to the ABB, in case of preceding instructions to perform measurements. By receiving instructions regarding how to act device as described above, more efficient use of radio resources may be achieved, and signaling in the communications system may be decreased According to some embodiments, receiving 304 instructions from the ABB on how to act comprises receiving instructions not to perform measurements on signals from base stations other than the ABB when the altitude is above a predefined threshold. This is done in order to decrease the amount of signaling in the communications system, since the WD is prevented from trying to communicate with base stations when it is too far up in the air for successfully communicating with any base stations other than the ABB.

According to some embodiments, receiving 304 instructions from the ABB on how to act comprises receiving instructions to perform measurements on signals from base stations other than the ABB, when the altitude is below a predefined threshold and performing 308 measurements on base stations other than the ABB, when the altitude is below the predefined threshold. The base stations other than the ABB may be ground base stations of the ground communications network. By instructing the WD to perform measurements when the aircraft is below a predefined threshold, and performing the measurements, it becomes possible to plan ahead for future cell selection decisions.

According to some embodiments, the method may further comprise receiving instructions to make 310 a cell selection decision based on the measurements, in case of a prior instruction to perform measurements. By having information gained through measurements on signals of other base stations than the ABB, such as signal strength, it becomes possible for the WD to determine if any base station may be suitable for cell selection. The cell selection decision may comprise determining a suitable cell for cell selection, and it may also comprise performing the cell selection.

According to some embodiments, the method may further comprise receiving instructions to predict 312 a future cell selection decision based on the measurements, in case of prior instructions to perform measurements and when the altitude information indicates an altitude rate of change. In some cases, a base station may not be suitable for cell selection at the point in time when the WD performs measurements on the signals, but it may be suitable at a future point in time. This may be calculated by using the present altitude and an altitude rate of change, in combination with the performed measurements. The measurements may also be performed over a period of time, such that a rate of change of the measurements may also be obtained, for example that the signal strength is increasing or decreasing at a certain rate. In some embodiments, the method may further comprise also performing the predicted cell selection decision.

In some embodiments, receiving 304 instructions from the ABB on how to act further comprises providing the measurements to the ABB, in case of receiving prior instructions to perform measurements. This enables the ABB to make decisions based on the performed measurements, such as if a handover of the WD should be made or if a NRT for a cell in which the WD resides and to which the ABB provides radio coverage should be updated.

In some embodiments, the method may comprise providing 306 the altitude information to a network node other than the ABB. For example, the altitude information may be provided to a base station of the ground communications network, by the WD including the altitude information in its RRC signaling. By including the altitude information when communicating with the ground communications system, the ground communications system will have better information regarding for example which base stations may be suitable for the WD to connect to.

In some embodiments, the altitude information received from the ABB is broadcasted by the ABB, such that all devices to which the ABB provides radio coverage may obtain the altitude information. The altitude information may for example be broadcasted in a LTE MasterInformationBlock, MIB, message, as defined in LTE (TS 36.331, version 14.4.0, sections 5.2.1.1 and 5.2.1.2)

In some embodiments, the altitude information is received from the ABB in a LTE SystemInformationBlock, SIB, message.

Figure 7:
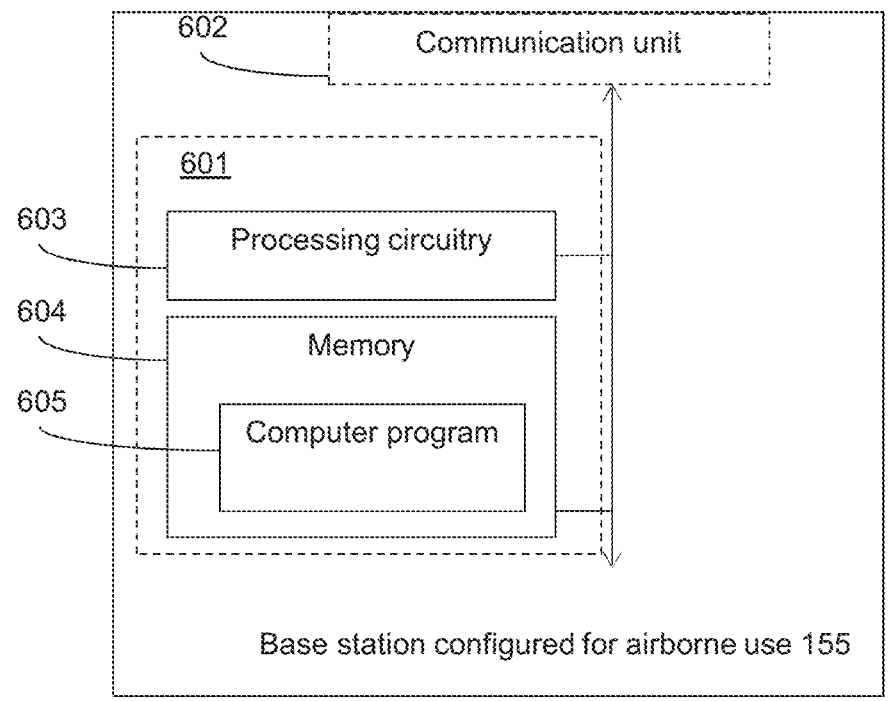
FIG. 7 shows a block schematic of a base station configured for airborne use.

FIG. 7, in conjunction with FIG. 1, shows a base station configured for airborne use 155, wherein the base station configured for airborne use 155 is arranged to provide radio coverage to a wireless device 150 residing in the aircraft 160 when the base station configured for airborne use 155 is arranged in the aircraft. The base station configured for airborne use 155 may be connected, via a satellite 175 or via A2G, to a ground communications network 180 comprising a number of ground base stations 165 and an Operations and Management, O&M, node 170. The base station configured for airborne use 155 comprises processing circuitry 603 and a memory 604. The processing circuitry 603 may comprise one or more programmable processors, application-specific integrated circuits, field programmable gate arrays or combinations of these (not shown) adapted to execute instructions. The memory contains instructions executable by said processing circuitry, whereby the base station configured for airborne use 155 is operative for obtaining, from the aircraft 160, altitude information indicating at least one of a present altitude of the aircraft and an altitude rate of change of the aircraft. The altitude information is typically obtained via aircraft sensors that reports the altitude information either directly to the base station configured for airborne use 155 or via a control unit of the aircraft. The base station configured for airborne use 155 is further operative for handling a connection of the WD 150 to the base station configured for airborne use 155, based on the obtained altitude information.

According to an embodiment, the base station configured for airborne use 155 is operative for instructing the WD to not perform measurements on base stations other than the base station configured for airborne use 155, when the altitude is above a predefined threshold.

According to an embodiment, the base station configured for airborne use 155 is operative for updating a neighbor relation table, NRT, for a first cell to which the base station configured for airborne use 155 provides radio coverage, based on the altitude information.

According to an embodiment, the base station configured for airborne use 155 is operative for instructing the WD to perform measurements on base stations other than the base station configured for airborne use 155, when the altitude is below a predefined threshold. The base station configured for airborne use 155 may further be operative for receiving the measurements from the WD.

According to an embodiment, the base station configured for airborne use 155 is further operative for updating a NRT, for a first cell to which the base station configured for airborne use 155 provides radio coverage, based on the received measurements.

According to an embodiment, the base station configured for airborne use 155 is further operative for making a handover decision for the WD, based on the received measurements.

According to an embodiment, when the altitude information indicates both a present altitude and an altitude rate of change, the base station configured for airborne use 155 is further operative for predicting a future handling of the connection of the WD.

According to an embodiment, the base station configured for airborne use 155 is further operative for providing the altitude information to the WD.

According to an embodiment, the base station configured for airborne use 155 is further operative for providing the altitude information to the WD by broadcasting the altitude information.

According to an embodiment, the base station configured for airborne use 155 is further operative for providing the altitude information to the WD in a MIB.

According to an embodiment, the base station configured for airborne use 155 is further operative for providing the altitude information to the WD in a SIB.

According to other embodiments, the base station configured for airborne use 155 may further comprise a communication unit 602, which may be considered to comprise conventional means for communicating with the WD 150. The instructions executable by said processing circuitry 603 may be arranged as a computer program 605 stored e.g. in the memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above.

The computer program 605 may comprise computer readable code means, which when run in base station configured for airborne use 155 causes the base station configured for airborne use 155 to perform the steps described in any of the described embodiments of the base station configured for airborne use 155. The computer program 605 may be carried by a computer program product connectable to the processing circuitry 603. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the communication network to which the base station configured for airborne use 155 has access via the communication unit 602. The computer program may then be downloaded from the server into the memory 604.

Figure 8:
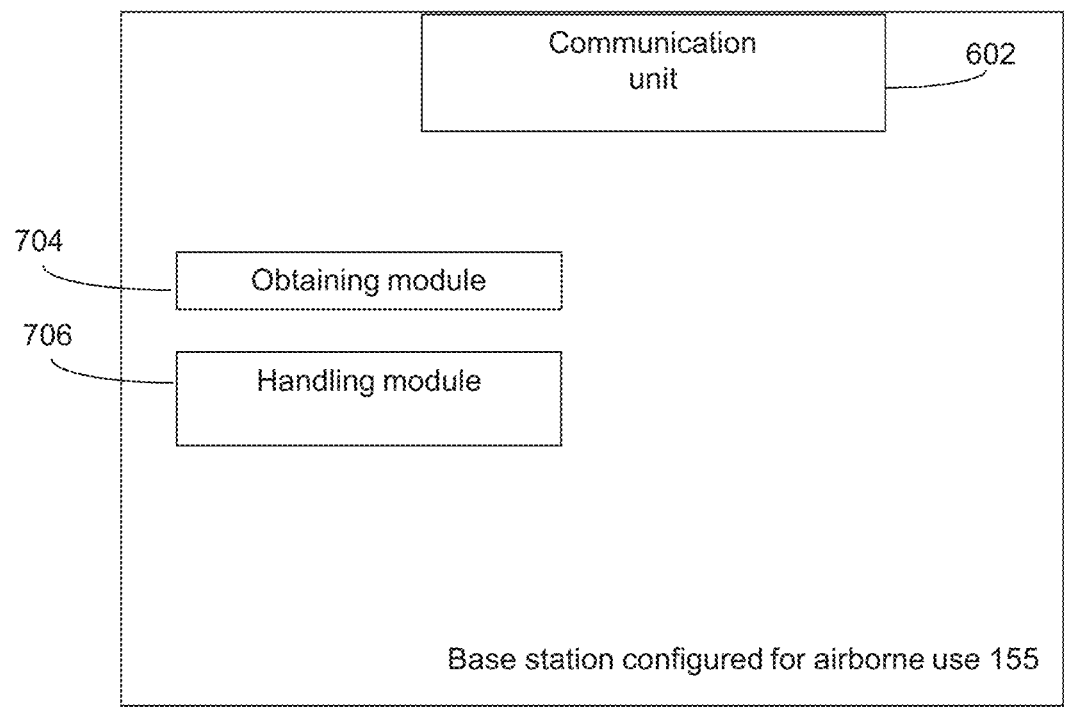
FIG. 8 shows a block schematic of a base station configured for airborne use.

FIG. 8, in conjunction with FIG. 1, shows an alternative embodiment of a base station configured for airborne use 155, wherein the base station configured for airborne use 155 is arranged to provide radio coverage to a wireless device 150 residing in the aircraft 160 when the base station configured for airborne use 155 is arranged in the aircraft. The base station configured for airborne use 155 may be connected, via a satellite 175, to a ground communications network 180 comprising a number of ground base stations 165 and an Operations and Management, O&M, node 170. The base station configured for airborne use 155 comprises an obtaining module 704 for obtaining 202, from the aircraft 160, altitude information indicating at least one of a present altitude of the aircraft and an altitude rate of change of the aircraft. The base station configured for airborne use 155 further comprises a handling module 706 for handling a connection of the WD 150 to the base station configured for airborne use 155, based on the obtained altitude information. The base station configured for airborne use 155 may further comprise a communication unit 602 similar to the communication unit of FIG. 7. In some embodiments, the modules 704, 706, 602 are implemented as a computer program running on processing circuitry such as a processor.

Figure 9:
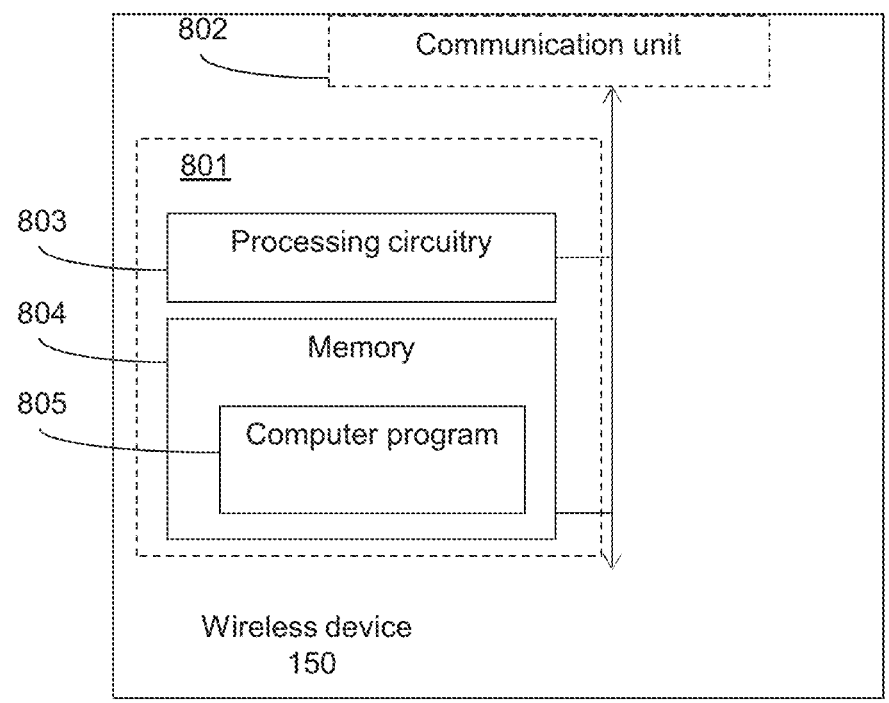
FIG. 9 shows a block schematic of a wireless device.

FIG. 9, in conjunction with FIG. 1, shows a wireless device 150 residing in an aircraft 160, wherein a base station configured for airborne use 155 is arranged at the aircraft 160. The WD is operable for wireless communication with the base station configured for airborne use 155, and when the WD and the base station configured for airborne use 155 are arranged at an aircraft, the WD receives radio coverage from the base station configured for airborne use 155. The base station configured for airborne use 155 may be connected, via a satellite 175 or via A2G, to a ground communications network 180 comprising a number of ground base stations 165 and an Operations and Management, O&M, node 170. The WD 150 comprises processing circuitry 803 and a memory 804. The processing circuitry 803 may comprise one or more programmable processors, application-specific integrated circuits, field programmable gate arrays or combinations of these (not shown) adapted to execute instructions. The memory contains instructions executable by said processing circuitry, whereby the WD 150 is operative for receiving altitude information indicating at least one of the present altitude of the aircraft 160 and an altitude rate of change of the aircraft 160, from the base station configured for airborne use 155.

According to an embodiment, the WD 150 is further operative for receiving instructions from the base station configured for airborne use 155 on how to act, based on the received altitude information. The step of receiving instructions from the base station configured for airborne use 155 on how to act may for example comprise receiving instructions to not perform measurements on any base stations other than the base station configured for airborne use 155 when the altitude of the aircraft is above a predefined threshold. It may also comprise receiving instructions to perform measurements on signals from base stations other than the base station configured for airborne use 155 when the altitude is below a predefined threshold and performing the measurements on base stations other than the base station configured for airborne use 155. It may further comprise receiving instructions regarding making a cell selection decision based on the measurements, such that the WD is instructed by the base station configured for airborne use 155 to make a cell selection to a base station when the performed measurements are above a certain threshold, for example when the signal strength is above a predefined level. The received instructions may be instructions for predicting a future cell selection decision based on the measurements. The received instructions may be instructions regarding providing the measurements to the base station configured for airborne use 155, in case of preceding instructions to perform measurements According to an embodiment, the WD 150 is operative for receiving instructions not to perform measurements on signals from base stations other than the base station configured for airborne use 155 when the altitude is above a predefined threshold.

According to an embodiment, the WD 150 is operative for receiving instructions to perform measurements on signals from base stations other than the base station configured for airborne use 155, when the altitude is below a predefined threshold, and performing measurements on base stations other than the base station configured for airborne use 155.

According to an embodiment, the WD 150 is further operative for receiving instructions to make a cell selection decision based on the measurements.

According to an embodiment, the WD 150 is further operative for receiving instructions to predict a future cell selection decision based on the measurements.

According to an embodiment, the WD 150 is further operative for providing the measurements to the base station configured for airborne use 155.

According to an embodiment, the WD 150 is further operative for providing the altitude information to a network node other than the base station configured for airborne use 155.

According to other embodiments, the WD 150 may further comprise a communication unit 802, which may be considered to comprise conventional means for communication with the base station configured for airborne use 155 as well as for communicating with ground base stations 165. The communication unit 802 may for this reason comprise transmitting units for transmitting wireless signals and receiving units for receiving wireless signals. The instructions executable by said processing circuitry 803 may be arranged as a computer program 805 stored e.g. in said memory 804. The processing circuitry 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the actions and/or methods mentioned above.

The computer program 805 may comprise computer readable code means, which when run in the WD 150 causes the WD to perform the steps described in any of the described embodiments of the WD. The computer program 805 may be carried by a computer program product connectable to the processing circuitry 803. The computer program product may be the memory 804. The memory 804 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 804. Alternatively, the computer program may be stored on a server or any other entity connected to the communication network to which the WD has access via the communication unit 802. The computer program may then be downloaded from the server into the memory 804.

Figure 10:
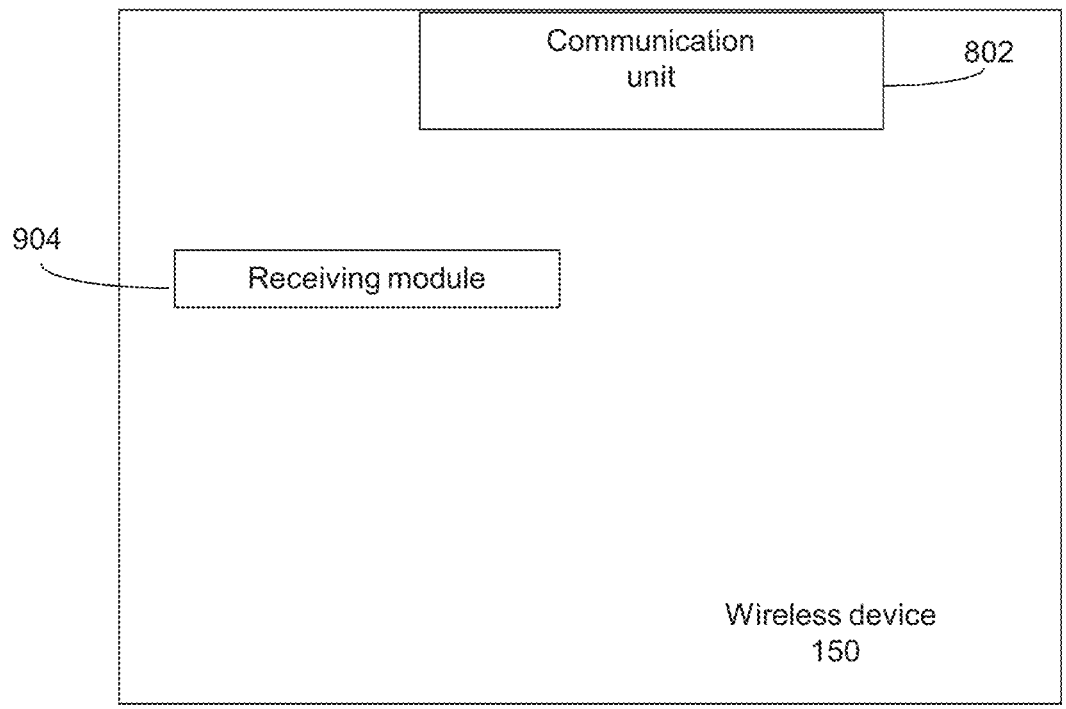
FIG. 10 shows a block schematic of a wireless device.

FIG. 10, in conjunction with FIG. 1, shows an alternative embodiment of a wireless device 150 residing in an aircraft 160, wherein a base station configured for airborne use 155 is arranged at the aircraft 160. The WD is operable for wireless communication with the ABB, and when the WD and the base station configured for airborne use 155 are arranged at an aircraft, the WD receives radio coverage from the base station configured for airborne use 155. The base station configured for airborne use 155 may be connected, via a satellite 175 or via A2G, to a ground communications network 180 comprising a number of ground base stations 165 and an Operations and Management, O&M, node 170. The WD 150 comprises a receiving module 904 for receiving altitude information indicating at least one of the present altitude of the aircraft 160 and an altitude rate of change of the aircraft 160, from the base station configured for airborne use 155. The WD 150 may further comprise a communication unit 802 similar to the communication unit of FIG. 9. In some embodiments, the modules 904, 802 are implemented as a computer program running on processing circuitry such as a processor.

Figure 11:
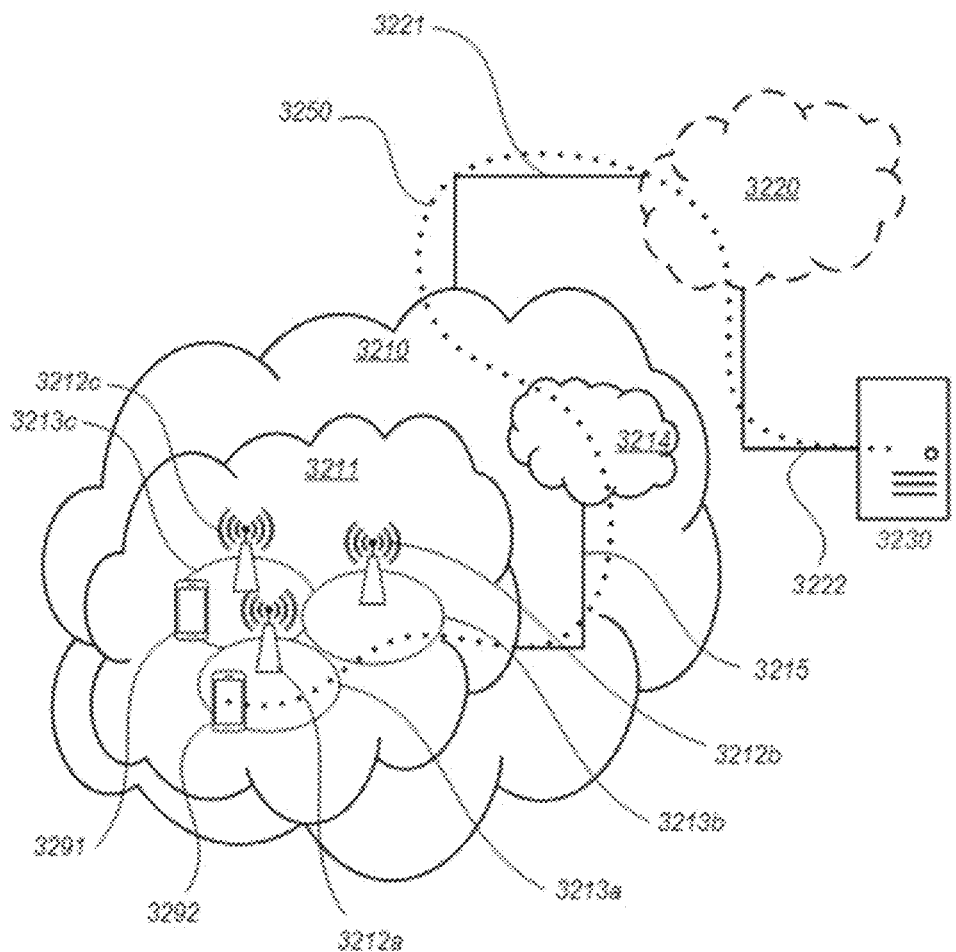
FIG. 11 schematically illustrates a telecommunication network connected via an intermediate network to a host computer.

With reference to FIG. 11, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b such as NBs, eNBs, gNBs or other types of wireless access points, and an airborne base station 3212c, each defining a corresponding coverage area 3213a, 3213b, 3213c. Each base station 3212a, 3212b, 3212c is connectable to the core network 3214 over a wired or wireless connection 3215. A first wireless device WD 3291 located in coverage area 3213c is configured to wirelessly connect to, or be paged by, the airborne base station 3212c. A second WD 3292 in coverage area 3213a is wirelessly connectable to the corresponding base station 3212a. While a plurality of WDs 3291, 3292 are illustrated in this example, the disclosed embodiments are equally applicable to a situation where a sole WD is in the coverage area or where a sole WD is connecting to the airborne base station 3212c.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected WDs 3291, 3292 and the host computer 3230. The connectivity may be described as an over-the-top (OTT) connection 3250. The host computer 3230 and the connected WDs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, an airborne base station 3212c may not or need not be informed about the past routing of an incoming downlink communication with data originating from a host computer 3230 to be forwarded (e.g., handed over) to a connected WD 3291. Similarly, the airborne base station 3212c need not be aware of the future routing of an outgoing uplink communication originating from the WD 3291 towards the host computer 3230.

Example implementations, in accordance with an embodiment, of the WD, airborne base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a WD 3330 connecting via an OTT connection 3350 terminating at the WD 3330 and the host computer 3310. In providing the service to the remote user, the host application 3312 may provide user data which is transmitted using the OTT connection 3350.

The communication system 3300 further includes an airborne base station 3320 provided in a telecommunication system and comprising hardware 3325 enabling it to communicate with the host computer 3310 and with the WD 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a WD 3330 located in a coverage area (not shown in FIG. 12) served by the airborne base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the airborne base station 3320 further includes processing circuitry 3328, which may comprise one or more programmable processors, application-specific integrated circuits, field programmable gate arrays or combinations of these (not shown) adapted to execute instructions. The airborne base station 3320 further has software 3321 stored internally or accessible via an external connection.

The communication system 3300 further includes the WD 3330 already referred to. Its hardware 3335 may include a radio interface 3337 configured to set up and maintain a wireless connection 3370 with an airborne base station serving a coverage area in which the WD 3330 is currently located. The hardware 3335 of the WD 3330 further includes processing circuitry 3338, which may comprise one or more programmable processors, application-specific integrated circuits, field programmable gate arrays or combinations of these (not shown) adapted to execute instructions. The WD 3330 further comprises software 3331, which is stored in or accessible by the WD 3330 and executable by the processing circuitry 3338. The software 3331 includes a client application 3332. The client application 3332 may be operable to provide a service to a human or non-human user via the WD 3330, with the support of the host computer 3310. In the host computer 3310, an executing host application 3312 may communicate with the executing client application 3332 via the OTT connection 3350 terminating at the WD 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 12:
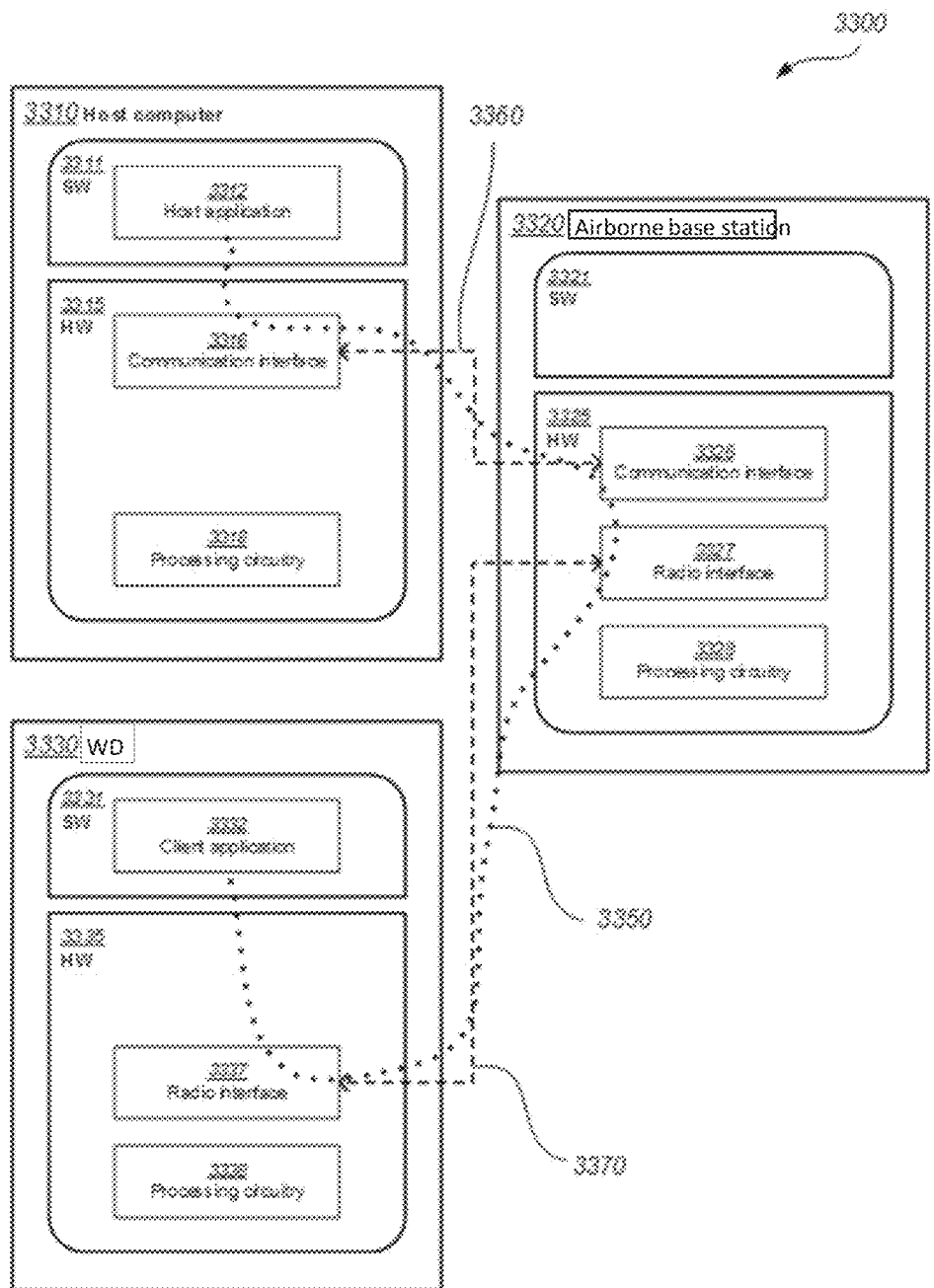
FIG. 12 is a generalized block diagram of a host computer communicating via an airborne base station with a user equipment over a partially wireless connection.

It is noted that the host computer 3310, airborne base station 3320 and WD 3330 illustrated in FIG. 12 may be identical to the host computer 3230, one of airborne base station 3212c and one of the WDs 3291, 3292 of FIG. 11, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the use equipment 3330 via the airborne base station 3320, without explicit reference to any intermediary devices and the precise routing of messages via these devices. Network infrastructure may determine the routing, which it may be configured to hide from the WD 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the WD 3330 and the airborne base station 3320 is in accordance with the teachings of the embodiments described throughout this disclosure. One or more of the various embodiments improve the performance of OTT services provided to the WD 3330 using the OTT connection 3350, in which the wireless connection 3370 forms the last segment. More precisely, the teachings of these embodiments may improve the latency and power consumption and thereby provide benefits such as reduced user waiting time and extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and WD 3330, in response to variations in the measurement results. The measurement procedure and/or the network functionality for reconfiguring the OTT connection 3350 may be implemented in the software 3311 of the host computer 3310 or in the software 3331 of the WD 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the airborne base station 3320, and it may be unknown or imperceptible to the airborne base station 3320. Such procedures and functionalities may be known and practiced in the art. In certain embodiments, measurements may involve proprietary WD signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 13:
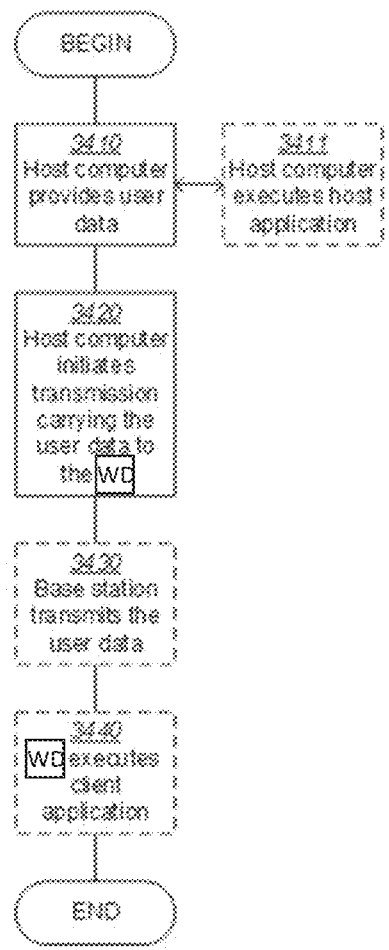
FIGS. 13 to 16 are flowcharts illustrating methods implemented in a communication system including a host computer, an airborne base station and a user equipment.

FIG. 13 is a flowchart illustrating a method implemented in a communication system, in accordance with one embodiment. The communication system includes a host computer, an airborne base station and a WD which may be those described with reference to FIGS. 32 and 33. For simplicity of the present disclosure, only drawing references to FIG. 13 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the WD. In an optional third step 3430, the airborne base station transmits to the WD the user data which was carried in the transmission that the host computer initiated, in accordance with the teachings of the embodiments described throughout this disclosure. In an optional fourth step 3440, the WD executes a client application associated with the host application executed by the host computer.

Figure 14:
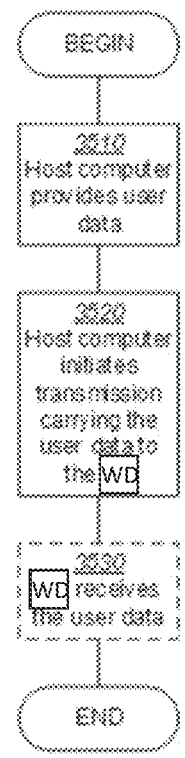

FIG. 14 is a flowchart illustrating a method implemented in a communication system, in accordance with one embodiment. The communication system includes a host computer, an airborne base station and a WD which may be those described with reference to FIGS. 32 and 33. For simplicity of the present disclosure, only drawing references to FIG. 14 will be included in this section. In a first step 3510 of the method, the host computer provides user data. In an optional substep (not shown) the host computer provides the user data by executing a host application. In a second step 3520, the host computer initiates a transmission carrying the user data to the WD. The transmission may pass via the airborne base station, in accordance with the teachings of the embodiments described throughout this disclosure. In an optional third step 3530, the WD receives the user data carried in the transmission.

Figure 15:
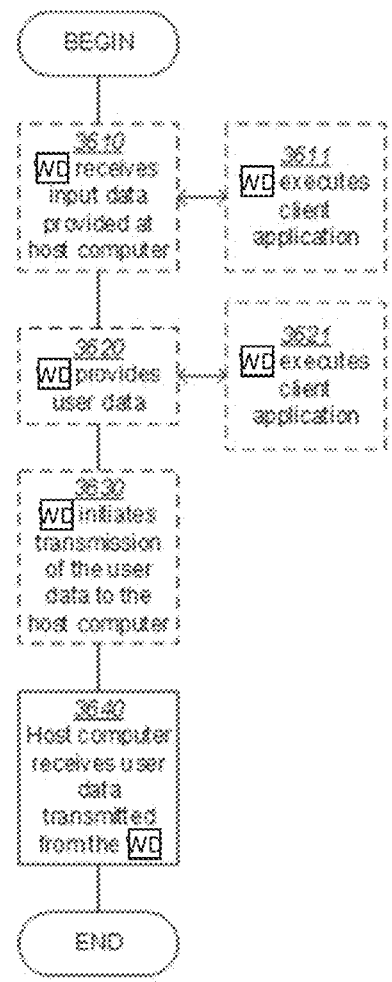

FIG. 15 is a flowchart illustrating a method implemented in a communication system, in accordance with one embodiment. The communication system includes a host computer, an airborne base station and a WD which may be those described with reference to FIGS. 32 and 33. For simplicity of the present disclosure, only drawing references to FIG. 15 will be included in this section. In an optional first step 3610 of the method, the WD receives input data provided by the host computer. Additionally or alternatively, in an optional second step 3620, the WD provides user data. In an optional substep 3621 of the second step 3620, the WD provides the user data by executing a client application. In a further optional substep 3611 of the first step 3610, the WD executes a client application which provides the user data in reaction to the received input data provided by the host computer. In providing the user data, the executed client application may further consider user input received from the user. Regardless of the specific manner in which the user data was provided, the WD initiates, in an optional third substep 3630, transmission of the user data to the host computer. In a fourth step 3640 of the method, the host computer receives the user data transmitted from the WD, in accordance with the teachings of the embodiments described throughout this disclosure.

Figure 16:
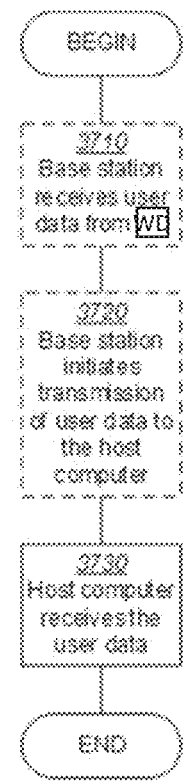

FIG. 16 is a flowchart illustrating a method implemented in a communication system, in accordance with one embodiment. The communication system includes a host computer, an airborne base station and a WD which may be those described with reference to FIGS. 32 and 33. For simplicity of the present disclosure, only drawing references to FIG. 16 will be included in this section. In an optional first step 3710 of the method, in accordance with the teachings of the embodiments described throughout this disclosure, the airborne base station receives user data from the WD. In an optional second step 3720, the airborne base station initiates transmission of the received user data to the host computer. In a third step 3730, the host computer receives the user data carried in the transmission initiated by the airborne base station.

More possible embodiments will now be described. Embodiments 1, 11, 21 and 31 represent a downstream aspect of the radio-related invention, and embodiments 41, 51, 61 and 71 represent an upstream aspect of the radio-related invention. In addition to the embodiments described below, optional embodiments similar to the embodiments for the base station configured for airborne use of FIGS. 7 and 8, and the embodiments for the wireless device of FIGS. 9 and 10, may also be applicable to the below described embodiments.

1. An airborne base station configured to communicate with a wireless device (WD), the airborne base station comprising a radio interface and processing circuitry configured for obtaining altitude information indicating at least one of the present altitude of the aircraft and an altitude rate of change of the aircraft, and handling a connection of the wireless device to the airborne base station based on the obtained altitude information.

5. A communication system including a host computer comprising:
processing circuitry configured to provide user data; and a communication interface configured to forward the user data to a cellular network for transmission to a wireless device (WD),
wherein the cellular network comprises an airborne base station having a radio interface and processing circuitry, the airborne base station's processing circuitry configured for obtaining altitude information indicating at least one of the present altitude of the aircraft and an altitude rate of change of the aircraft, and handling a connection of the wireless device to the airborne base station based on the obtained altitude information.

6. The communication system of embodiment 5, further including the airborne base station.

7. The communication system of embodiment 6, further including the WD, wherein the WD is configured to communicate with the airborne base station.

8. The communication system of embodiment 7, wherein:
the processing circuitry of the host computer is configured to execute a host application, thereby providing the user data; and
the WD comprises processing circuitry configured to execute a client application associated with the host application.

11. A method implemented in an airborne base station, comprising obtaining altitude information indicating at least one of the present altitude of the aircraft and an altitude rate of change of the aircraft, and handling a connection of the wireless device to the airborne base station based on the obtained altitude information.

15. A method implemented in a communication system including a host computer, an airborne base station and a wireless device (WD), the method comprising:
at the host computer, providing user data; and
at the host computer, initiating a transmission carrying the user data to the WD via a cellular network comprising the airborne base station, wherein the airborne base station obtains altitude information indicating at least one of the present altitude of the aircraft and an altitude rate of change of the aircraft, and handles a connection of the wireless device to the airborne base station based on the obtained altitude information.

16. The method of embodiment 15, further comprising:
at the airborne base station, transmitting the user data.

17. The method of embodiment 16, wherein the user data is provided at the host computer by executing a host application, the method further comprising:
at the WD, executing a client application associated with the host application.

21. A wireless device (WD) configured to communicate with an airborne base station, the WD comprising a radio interface and processing circuitry configured for receiving altitude information indicating at least one of the present altitude of the aircraft and an altitude rate of change of the aircraft, from the airborne base station.

25. A communication system including a host computer comprising:
processing circuitry configured to provide user data; and
a communication interface configured to forward user data to a cellular network for transmission to a wireless device (WD),
wherein the WD comprises a radio interface and processing circuitry, the WD's processing circuitry configured for receiving altitude information indicating at least one of the present altitude of the aircraft and an altitude rate of change of the aircraft, from the airborne base station.

26. The communication system of embodiment 25, further including the WD.

27. The communication system of embodiment 26, wherein the cellular network further includes an airborne base station configured to communicate with the WD.

28. The communication system of embodiment 26 or 27, wherein:
the processing circuitry of the host computer is configured to execute a host application, thereby providing the user data; and
the WD's processing circuitry is configured to execute a client application associated with the host application.

31. A method implemented in a wireless device (WD), comprising receiving altitude information indicating at least one of the present altitude of the aircraft and an altitude rate of change of the aircraft, from the airborne base station.

35. A method implemented in a communication system including a host computer, an airborne base station and a wireless device (WD), the method comprising:
at the host computer, providing user data; and
at the host computer, initiating a transmission carrying the user data to the WD via a cellular network comprising the airborne base station, wherein the WD receives altitude information indicating at least one of the present altitude of the aircraft and an altitude rate of change of the aircraft, from the airborne base station.

36. The method of embodiment 35, further comprising:
at the WD, receiving the user data from the airborne base station.

41. A wireless device (WD) configured to communicate with an airborne base station, the WD comprising a radio interface and processing circuitry configured for receiving altitude information indicating at least one of the present altitude of the aircraft and an altitude rate of change of the aircraft, from the airborne base station.

45. A communication system including a host computer comprising:
a communication interface configured to receive user data originating from a transmission from a wireless device (WD) to an airborne base station,
wherein the WD comprises a radio interface and processing circuitry, the WD's processing circuitry configured for receiving altitude information indicating at least one of the present altitude of the aircraft and an altitude rate of change of the aircraft, from the airborne base station.

46. The communication system of embodiment 45, further including the WD.

47. The communication system of embodiment 46, further including the airborne base station, wherein the airborne base station comprises a radio interface configured to communicate with the WD and a communication interface configured to forward to the host computer the user data carried by a transmission from the WD to the airborne base station.

48. The communication system of embodiment 46 or 47, wherein:
the processing circuitry of the host computer is configured to execute a host application; and
the WD's processing circuitry is configured to execute a client application associated with the host application, thereby providing the user data.

49. The communication system of embodiment 46 or 47, wherein:
the processing circuitry of the host computer is configured to execute a host application, thereby providing request data; and the WD's processing circuitry is configured to execute a client application associated with the host application, thereby providing the user data in response to the request data.

51. A method implemented in a wireless device (WD), comprising receiving altitude information indicating at least one of the present altitude of the aircraft and an altitude rate of change of the aircraft, from the airborne base station.

52. The method of embodiment 51, further comprising: providing user data; and
forwarding the user data to a host computer via the transmission to the airborne base station.

55. A method implemented in a communication system including a host computer, an airborne base station and a wireless device (WD), the method comprising:
at the host computer, receiving user data transmitted to the airborne base station from the WD, wherein the WD receives altitude information indicating at least one of the present altitude of the aircraft and an altitude rate of change of the aircraft, from the airborne base station.

56. The method of embodiment 55, further comprising:
at the WD, providing the user data to the airborne base station.

57. The method of embodiment 56, further comprising:
at the WD, executing a client application, thereby providing the user data to be transmitted; and
at the host computer, executing a host application associated with the client application.

58. The method of embodiment 56, further comprising:
at the WD, executing a client application; and
at the WD, receiving input data to the client application, the input data being provided at the host computer by executing a host application associated with the client application,
wherein the user data to be transmitted is provided by the client application in response to the input data.

61. An airborne base station configured to communicate with a wireless device (WD), the airborne base station comprising a radio interface and processing circuitry configured for obtaining altitude information indicating at least one of the present altitude of the aircraft and an altitude rate of change of the aircraft, and handling a connection of the wireless device to the airborne base station based on the obtained altitude information.

65. A communication system including a host computer comprising a communication interface configured to receive user data originating from a transmission from a wireless device (WD) to an airborne base station, wherein the airborne base station comprises a radio interface and processing circuitry, the airborne base station's processing circuitry configured for obtaining altitude information indicating at least one of the present altitude of the aircraft and an altitude rate of change of the aircraft, and handling a connection of the wireless device to the airborne base station based on the obtained altitude information.

66. The communication system of embodiment 65, further including the airborne base station.

67. The communication system of embodiment 66, further including the WD, wherein the WD is configured to communicate with the airborne base station.

68. The communication system of embodiment 67, wherein:
the processing circuitry of the host computer is configured to execute a host application; the WD is configured to execute a client application associated with the host application, thereby providing the user data to be received by the host computer.

71. A method implemented in an airborne base station, comprising obtaining altitude information indicating at least one of the present altitude of the aircraft and an altitude rate of change of the aircraft, and handling a connection of the wireless device to the airborne base station based on the obtained altitude information.

75. A method implemented in a communication system including a host computer, an airborne base station and a wireless device (WD), the method comprising:
at the host computer, receiving, from the airborne base station, user data originating from a transmission which the airborne base station has received from the WD, wherein the WD receives altitude information indicating at least one of the present altitude of the aircraft and an altitude rate of change of the aircraft, from the airborne base station.

76. The method of embodiment 75, further comprising:
at the airborne base station, receiving the user data from the WD.

77. The method of embodiment 76, further comprising:
at the airborne base station, initiating a transmission of the received user data to the host computer.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the example figures, a broken line generally signifies that the feature within the broken line is optional.

The invention claimed is:

1. A method performed by an airborne base station, the airborne base station being arranged at an aerial vehicle and providing radio coverage to a wireless device associated with the aerial vehicle, the method comprising:
obtaining altitude information indicating the present altitude of the aerial vehicle;
handling a connection of the wireless device to the airborne base station based on the obtained altitude information,
wherein handling a connection of the wireless device to the airborne base station comprises transmitting to the wireless device instructions related to measurements on signals from ground base stations other than the airborne base station, when the present altitude is above a predefined threshold, wherein the measurements comprise a rate of change of a parameter, wherein handling the connection of the wireless device further comprises making a handover decision based at least on the rate of change of the parameter.

2. The method according to claim 1, wherein the step of handling a connection of the wireless device to the airborne base station comprises:

instructing the wireless device to perform measurements on signals from base stations other than the airborne base station, when the altitude is below a predefined threshold, and receiving the measurements from the wireless device.

3. The method according to claim 1, wherein the step of handling a connection of the wireless device to the airborne base station comprises:

updating a neighbor relation table, NRT, for a first cell to which the airborne base station provides radio coverage, based on the received measurements.

4. The method according to claim 1, wherein the step of handling a connection of the wireless device to the airborne base station comprises, when the altitude information comprises an indication of both an altitude and an altitude rate of change:

predicting a future handling of a connection of the wireless device to the airborne base station, based on the received measurements.

5. A method performed by a wireless device, the wireless device associated with an aerial vehicle, wherein an airborne base station is arranged at the aerial vehicle and provides radio coverage to the wireless device, the method comprising:

receiving altitude information indicating the present altitude of the aerial vehicle, from the airborne base station; and receiving instructions from the base station configured for airborne use on how to act, based on the received altitude information, wherein receiving the instructions on how to act comprises instructions related to measurements on signals from ground base stations other than the airborne base station, when the present altitude is above a predetermined threshold, wherein the measurements comprise a rate of change of a parameter, wherein a connection of the wireless device with the airborne base station is handled in response to a handover decision based at least on the rate of change of the parameter.

6. The method according to claim 5, wherein the altitude information is received in a MasterInformationBlock, MIB message.

7. The method according to claim 5, wherein the altitude information is received in a SystemInformationBlock, SIB, message.

8. A base station configured for airborne use, which is arranged to provide radio coverage to a wireless device associated with an aerial vehicle, when the base station configured for airborne use is arranged in the aerial vehicle, the base station configured for airborne use comprising:

processing circuitry; and a memory, said memory containing instructions executable by said processing circuitry, whereby said the base station configured for airborne use is operative for:

obtaining altitude information indicating the present altitude of the aerial vehicle;

handling a connection of the wireless device to the base station configured for airborne use based on the obtained altitude information; and transmitting to the wireless device instructions related to measurements on signals from ground base stations other than the base station configured for airborne use, when the present altitude is above a predefined threshold, wherein the measurements comprise a rate of change of a parameter, wherein handling the connection of the wireless device further comprises making a handover decision based at least on the rate of change of the parameter.

9. The base station configured for airborne use according to claim 8, further being operative for:

updating a neighbor relation table, NRT, for a first cell to which the base station configured for airborne use provides radio coverage, based on the altitude information.

10. The base station configured for airborne use according to claim 8, further being operative for:

instructing the wireless device to perform measurements on signals from base stations other than the base station configured for airborne use, when the altitude is below a predefined threshold, and receiving the measurements from the wireless device.

11. The base station configured for airborne use according to claim 8, further being operative for:

updating a neighbor relation table, NRT, for a first cell to which the base station configured for airborne use provides radio coverage, based on the received measurements.

12. The base station configured for airborne use according to claim 8, further being operative for:

predicting a future handling of a connection of the wireless device to the base station configured for airborne use, based on the received measurements.

13. The base station configured for airborne use according to claim 8, further being operative for performing the following:

obtaining altitude information indicating at least one of the present altitude of the aerial vehicle and an altitude rate of change of the aerial vehicle;

handling a connection of the wireless device to the airborne base station based on the obtained altitude information; and wherein the step of handling a connection of the wireless device to the airborne base station comprises providing the altitude information to the wireless device.

14. A wireless device, operable for wireless communication with a base station configured for airborne use, wherein when the wireless device and the base station configured for airborne use are arranged at an aerial vehicle, the wireless device receives radio coverage from the base station configured for airborne use, the wireless device comprising:

processing circuitry; and a memory, said memory containing instructions executable by said processing circuitry, whereby said wireless device is operative for:

receiving altitude information indicating the present altitude of the aerial vehicle, from the base station configured for airborne use;

receiving instructions from the base station configured for airborne use on how to act, based on the received altitude information, wherein receiving the instructions on how to act comprises an instruction related to measurements on signals from ground base stations other than the airborne base station, when the present altitude is above a predetermined threshold, wherein the measurements comprise a rate of change of a parameter, wherein a connection of the wireless device with the airborne base station is handled in response to a handover decision based at least on the rate of change of the parameter.

15. The wireless device according to claim 14, further operative for:

providing the altitude information to a network node other than the base station configured for airborne use.

16. The wireless device according to claim 14, further operative for performing the following:
 receiving altitude information indicating at least one of the present altitude of the aerial vehicle and an altitude rate of change of the aerial vehicle, from the airborne base station; and
 wherein the received altitude information is broadcasted.

\* \* \* \* \*